United States Patent [19]
Kampf et al.

[11] 3,787,878
[45] Jan. 22, 1974

[54] DUAL CHANNEL STRIP CHART RECORDER

[75] Inventors: Richard S. Kampf, Costa Mesa; Lisle W. Sultzbaugh, Whittier, both of Calif.

[73] Assignee: Beckman Instruments, Inc., Fullerton, Calif.

[22] Filed: July 3, 1972

[21] Appl. No.: 268,496

[52] U.S. Cl. .................. 346/49, 346/17, 346/136, 346/139 B, 346/139 C
[51] Int. Cl. .............................. G01d 9/30
[58] Field of Search ............ 346/49, 17, 136, 139 R, 346/139 A, 139 B, 139 C

[56] References Cited
UNITED STATES PATENTS

| | | | |
|---|---|---|---|
| 3,392,402 | 7/1968 | Hartai | 346/31 |
| 1,056,950 | 3/1913 | Sheperdson | 346/49 X |
| 3,290,691 | 12/1966 | Leidy | 346/17 |
| 3,380,065 | 4/1968 | Alpert et al. | 346/136 X |

*Primary Examiner*—Joseph W. Hartary
*Attorney, Agent, or Firm*—James M. Thomson et al.

[57] ABSTRACT

A dual channel strip chart recorder for providing two overlapping traces on a movable chart without time displacement therebetween. One trace is narrow and the other trace is wide to facilitate interpretation of the chart. The recorder utilizes pressure sensitive chart paper which can be written upon from either side and viewed from the front side. The recorder uses one stylus to write on the back of the paper and another opposed stylus to write upon the front of the paper. The styli are driven back and forth across the moving chart by two corresponding movable steel bands, each of which acts as a back-up surface for the opposing stylus. A special styli design is provided to permit stylus crossover without hang-up and to prevent either stylus from punching through the chart paper.

12 Claims, 9 Drawing Figures

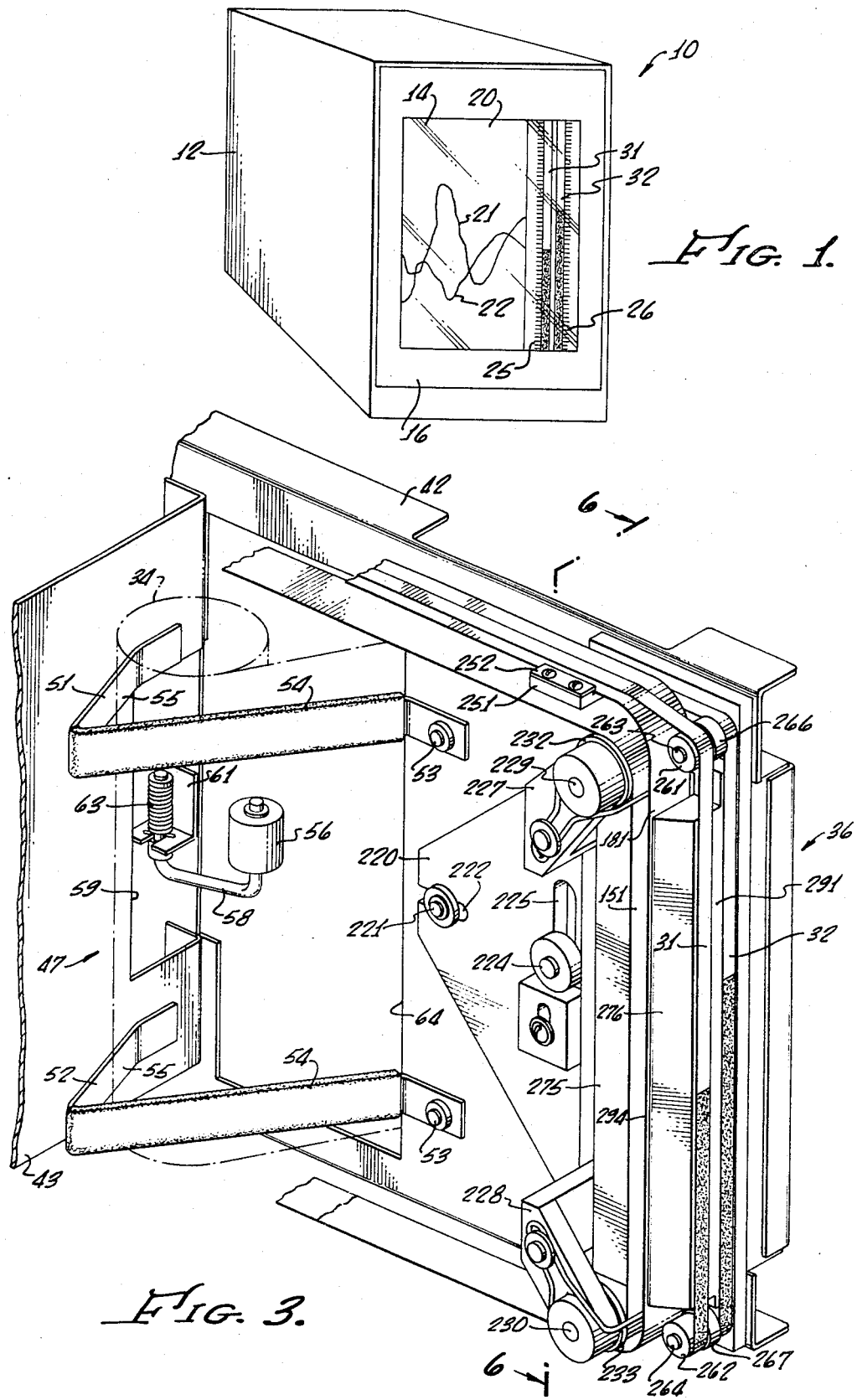

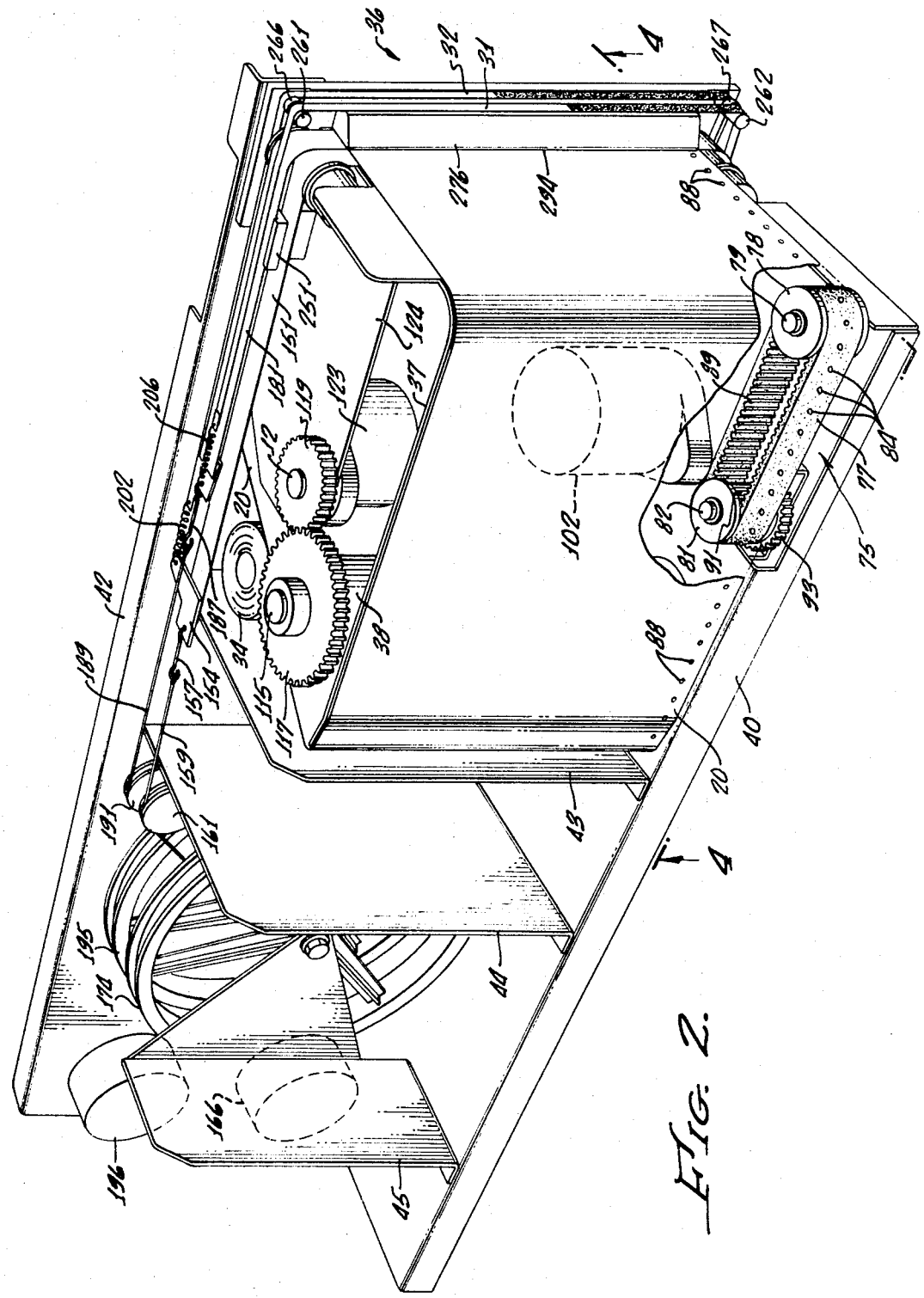

DUAL CHANNEL STRIP CHART RECORDER

BACKGROUND OF THE INVENTION

The present invention concerns a two-pen strip chart recorder that provides two overlapping traces on a movable chart without time displacement between the traces. More particularly the invention concerns such a two-pen recorder which utilizes pressure sensitive chart paper and has one pen or stylus to write upon the back side of the paper and another stylus to write upon the front side of the paper, with both traces being viewable from the front side of the paper.

A need exists in the prior art for two-pen recorders capable of forming two traces on the same chart with each trace being related to an independent electrical input. Various two-pen strip chart recorders have been used for this purpose. In one such type recorder the pens are mounted on the same side of the chart paper and are spaced apart so that two overlapping time-displaced traces are formed on the chart. This is undesirable since any interpretation of the chart must allow for the time displacement of the two traces. Particularly where direct comparison of the two traces is necssary, difficulty ensues in accurately interpreting the recorded results.

Two-pen systems also have been utilized with various mechanical arrangements to permit one pen to jump or skip over the other pen when the traces are to cross. Clearly such systems are quite complicated. Other prior art systems include electronic controls for transferring the function of the first pen to the second pen and vice versa upon crossover of the traces. Such systems must include complex electrical control means to effect trace crossover on the charts. Accordingly, a simple, economical means is needed for recording two traces on a movable chart without time displacement therebetween.

SUMMARY OF THE INVENTION

Accordingly, it is an object of the invention to provide a two-pen strip chart recorder for recording two traces on a strip chart without time displacement therebetween which overcomes the disadvantages of the prior art systems mentioned above.

It is another object of the invention to provide a two-pen recorder adapted to use pressure sensitive chart paper that can be written on from either side, which utilizes one stylus to write upon the back side of the paper and another stylus to write upon the front side of the paper whereby trace crossover is possible in a simple effective apparatus that is economical to manufacture and maintain.

The above and other objects are attained in the strip chart recorder wherein the pressure sensitive chart paper is mounted on a roll at a supply station and is dispensed therefrom along a path which passes a recording station, a chart drive station, and ultimately reaches a storage station where the chart paper is stored by respooling or stacking thereof. The recording station includes two pens or styli, one of which is used to write upon the back side of the chart and another of which is used to write on the front side of the chart. The styli are mounted upon movable, flexible steel bands that are adapted to traverse along a recording path that extends transversely to the direction of movement of the chart paper. Each of the styli is operatively associated with one of the movable steel bands and has its point biased against an opposing steel band whereby a back-up surface or writing surface is provided for each stylus. The flexible steel bands are associated with driving means and trained about pulleys located proximate either edge of the chart paper to provide a compact design. A unique stylus design is utilized to permit the styli to cross over each other as they move along the same recording path without hang-up and without punching through the chart paper.

BRIEF DESCRIPTION OF THE DRAWINGS

These and other features and advantages of the invention will become apparent from the following detailed description taken in conjunction with the accompanying drawings wherein:

FIG. 1 is a perspective view illustrating a recorder comprising one preferred embodiment of the invention;

FIG. 2 is a perspective view of the recorder illustrated in FIG. 1 with the cover removed;

FIG. 3 is an enlarged perspective view of a recording station utilized in the embodiment of FIGS. 1 and 2;

DETAILED DESCRIPTION OF THE INVENTION

Figure 4:
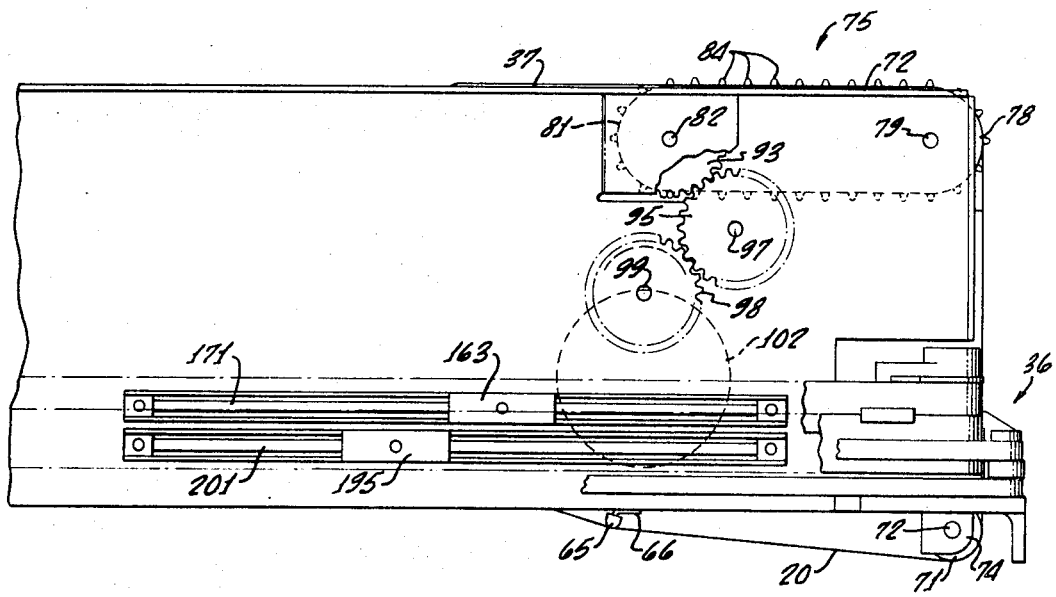
FIG. 4 is a partial sectional view taken along lines 4—4 in FIG. 2.

Referring now to the drawings and particularly to FIG. 1 a preferred embodiment of the invention is illustrated comprising a two-pen strip chart recorder 10 including a housing 12 provided with a viewing window 14 in a door 16 hinged to one end of the housing. The chart recorder includes a movable chart 20, visible through window 14, having two overlapping continuous traces 21, 22 formed thereon. Also visible through window 14 are movable indicator strips 31, 32 having marks thereon corresponding respectively to the positions of the styli forming traces 21, 22 for displaying the instantaneous amplitude of each of the traces. Indicator strips 31, 32 are flanked, on either side, by fixed scale strips 25, 26 bearing appropriate scale indicia.

The arrangement illustrated permits viewing of the chart through window 14 and comparison of the instantaneous values of traces 21, 22. If desired, door 16 can be opened and the recorder withdrawn partway from the housing for closer inspection of the chart.

Referring particularly to FIGS. 2-4, means are disclosed for dispensing chart paper continuously from a chart supply roll 34 advancing the chart paper past a recording station 36 and a paper guide 37, and respooling the chart paper upon a take-up roll 38 comprising a chart storage station. The chart supply means are generally supported upon a main deck 40 and a side deck 42 extending at a right angle from one edge of main deck 40. The main deck and side deck are generally reinforced and subdivided into several sections by rectangular support brackets 43, 44, 45 secured thereto.

Referring now to FIG. 3, supply roll 34 is illustrated in dotted outline supported at a supply roll station 47 that includes V brackets 51, 52 each having one end secured to bracket 43 and another end secured to side deck 42 by suitable means such as bolts 53. One side of each of the V brackets is provided with a suitable coating 54 of resilient material, creating a high friction against the paper. The other side of each of the V brackets is provided with a coating 55 of low friction material such as Teflon tape. Accordingly with the paper roll positioned as illustrated in FIG. 3, chart paper can be withdrawn cntinuously from the roll with satisfactory back friction being provided by the contact between the roll and resilient coatings 54 on the V brackets. The use of the low friction material on the other side of the brackets prevents the roll from tending to roll out of the V brackets.

Supply roll 34 is held in contact with the V brackets by a retaining roller 56 rotatably secured at one end of a U-shaped pin 58. The other end of pin 58 extends through a cut-out portion 59 in bracket 43 and is secured to an extended end of an L-shaped bracket 61 fastened to side deck 42. Pin 58 and roller 56 are biased toward supply roll 34 by a coil spring 63 having one end secured to bracket 61 and another end secured to the upper end of pin 58. The spring can be overcome by manual withdrawal of roller 56 away from the supply roll to permit removal of the roll, but otherwise provides sufficient tension upon roller 56 to firmly retain the roll in V brackets 51, 52.

A window or opening 64 is provided in the side deck adjacent the supply roll station to enable easy insertion and removal of the supply roll from the side of the recorder when it is withdrawn from the housing. Upon unrolling from the supply roll the chart paper is trained through opening 64 in the side deck and is withdrawn toward the front of the recorder. The chart paper rides over a contoured edge 65 supported on a bracket 66 attached to the side deck provided adjacent the periphery of opening 64 so that the paper does not encounter a sharp edge that might cut or otherwise damage it.

As best seen in FIG. 4, chart paper 20 is then trained around a roller 71 supported upon a shaft 72 that is rotatably mounted upon brackets 74 secured at opposite edges of side deck 42. Chart 20 is drawn through recording station 36 where traces are recorded thereon in a manner described hereinafter. The chart paper then advances along a path adjacent guide 37 to a chart drive station 75 that is particularly illustrated in FIGS. 2 and 4. The chart drive station, generally supported on main deck 40, includes a chart drive belt 77 that is trained about an idler roller 78 rotatably mounted upon a shaft 79 secured to main deck 40, and about a drive roller 81 rotatably secured to a shaft 82 also secured to the main deck. Drive belt 77 is formed of flexible, resilient material such as polypropylene and includes a row of pins or projections 84 that extend upwardly from theouter surface of the center of the belt. Pins 84 the outer spaced in alignment at regular intervals to match corresponding aligned holes 88 formed along one edge of chart 20. Accordingly, when chart 20 is trained over the drive belt, projections 84 project through holes 88 in the chart and engage the chart for advancement thereof.

The inner periphery of drive belt 77 is provided with teeth 89 which engage matching teeth 91 formed about the periphery of rollers 78 and 81 respectively. A drive gear 93 is secured to the bottom of roller 81, having teeth formed thereon adapted to engage teeth on a corresponding idler gear 95. Gear 95 is rotatably supported upon a shaft 97 connected to the main deck. A motor drive gear 98 is also provided, secured to shaft 99 of a motor 102 that is mounted on deck 40. Accordingly, selective energization of motor 102, from a power source not illustrated, causes movement of drive belt 77 and advances chart 20 at a predetermined rate of speed. It is envisioned that chart 20 will be driven at a constant rate of speed although, if desired, the chart could be advanced intermittently or at a variable rate.

Paper guide 37 is of generally L-shaped configuration and of approximately the same width as chart 20. The guide is secured at one edge to side deck 42 and at another edge to main deck 40. As shown, the lower corner of guide 37 is recessed to accommodate the chart drive station, and thepaper supporting surface of guide 37 is located such that projections the paper on drive belt 77 extend beyond the guide surface to engage holes 88 in the chart. The left edge of guide 37, as viewed in FIG. 2, is bent at a slight angle and is provided with a nylon rub strip pressed over the edge of the guide to permit chart 20 to be trained therearound without damage.

Immediately behind the left end of guide 37, take-up roll 38 is removably secured upon a shaft 115 that is rotatably secured to main deck 40, by means not illustrated. The upper end of shaft 115 supports a driven gear 117 which is adapted for rotation by a drive gear 119 secured to a shaft 121 of a motor 123. Motor 123 is supported from a bracket 125 that projects laterally from the upper edge of side deck 42. Accordingly, energization of motor 123, from a power source not illustrated, causes the rotation of shaft 115 necessary to respool chart 120 upon the take-up roll. Motor 123 is provided with a built-in overrunning clutch, so by manually turning gear 117 the paper may be advanced and taken up without power, to facilitate loading and enable desired time markings on the chart to be properly set.

It is envisioned that chart 20 comprise a pressure sensitive paper that is responsive to pressure exerted thereon from either side such that a trace is produced by such pressure that is viewable from the front side of the paper. One example of such a paper that is commercially avaialbe is marketed by Three M Corporation under the tradename Type 100, Sub No. 12 Action Paper.

Figure 5:
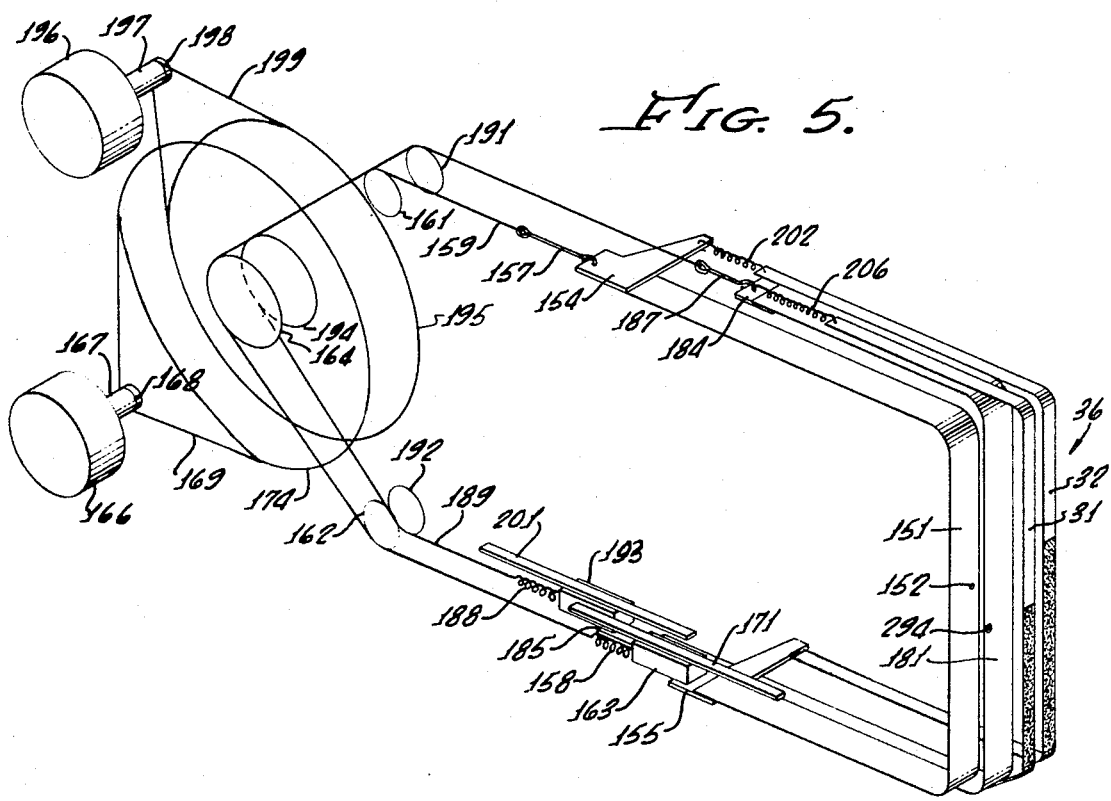
FIG. 5 is a diagrammatic view illustrating details of the stylus drive system utilized in the preferred embodiment.

Referring now to FIG. 5 the basic elements of recording station 36 and a drive arrangement for the styli of the recording station are diagrammatically indicated. A thin, flexible steel band 151 is provided having a hole 152 formed therein near one edge. Opening 152 is adapted to receive a stylus not illustrated and band 151 is adapted to be moved laterally with respect to the chart paper to carry the stylus back and forth across the paper to form a trace. Thus, band 151 is connected to brackets 154, 155 at either end thereof. Bracket 154 is connected by means of link 157 to a flexible member 159 such as a steel cable or wire. The flexible member is trained around a pulley arrangement including idler pulleys 161, 162 and a drive drum 164 and is connected to bracket 155 through spring 158 and potentiometer contact slider block 163. Accordingly, a continuous loop is defined by the combination of flexible member 159, band 151 and their connecting elements. Therefore rotation of drive drum 164 in either of two opposite directions results in corresponding movement of band 151 sufficient to move stylus opening 152 from one side of the chart paper to the other.

A motor 166 is provided having a shaft 167 secured to a drive pulley 168 that is mechanically linked with a drive wheel 174 by a flexible member 169 such as a drive belt or wire. Drive wheel 174 and drive drum 164 are secured together.

Another flexible steel band 181 is provided having a stylus 294 formed at one edge thereof facing band 151. As is apparent from FIG. 5, stylus 294 is located at the edge of band 181 that is proximate band 151. Furthermore band 181 is offset with respect to band 151 so that opening 152 and stylus 294 traverse aligned paths on either side of a chart path which extends between the bands.

End brackets 184, 185 are secured to opposite ends of band 181. End bracket 185 is connected to a contact slider block 193 and via a spring 188 to a flexible member 189, such as a steel cable or wire. Flexible member 189 is trained about idler pulleys 191, 192 and a drive drum 194 having a drive wheel 195 attached thereto. Member 189 is attached to bracket 184 by a link 187 so that a continuous loop is formed including band 181 and flexible member 189. A drive motor 196 is provided having a shaft 197 to which a drive pulley 198 is secured. Pulley 198 is mechanically interconnected with wheel 195 by a flexible member 199, such as a flat belt so that band 181 can be selectively advanced in either direction.

Still referring to FIG. 5, springs 202, 206 are secured respectively between brackets 154, 184 and the ends of flexible indicator strips 31 and 32. Each of the indicator strips bears an indicator mark or colored portion, visible in FIG. 1, to indicate the instantaneous position of the respective stylus as the strips move coordinately with the stylus bands. In addition, springs 158, 188, secured between the contact slider blocks and the ends of flexible members 159 and 189, provide the necessary tension to the tape loops.

Contact slider blocks 163, 193 each forms part of a conventional position sensitive device (commonly referred to as a linear motion potentiometer) associated with each stylus band to develop an electrical signal proportional to the instantaneous position of the stylus. Thus slider block 163, movable with band 151, carries a wiper that movably contacts a potentiometer element 171 associated therewith, and slider block 193, movable with band 181, carries a wiper that movably contacts potentiometer element 201 associated therewith. Both potentiometer elements are energized in well know fashion and the electrical signals developed therefrom are utilized in a servosystem that controls the motors used to actuate the stylus bands.

Figure 6:
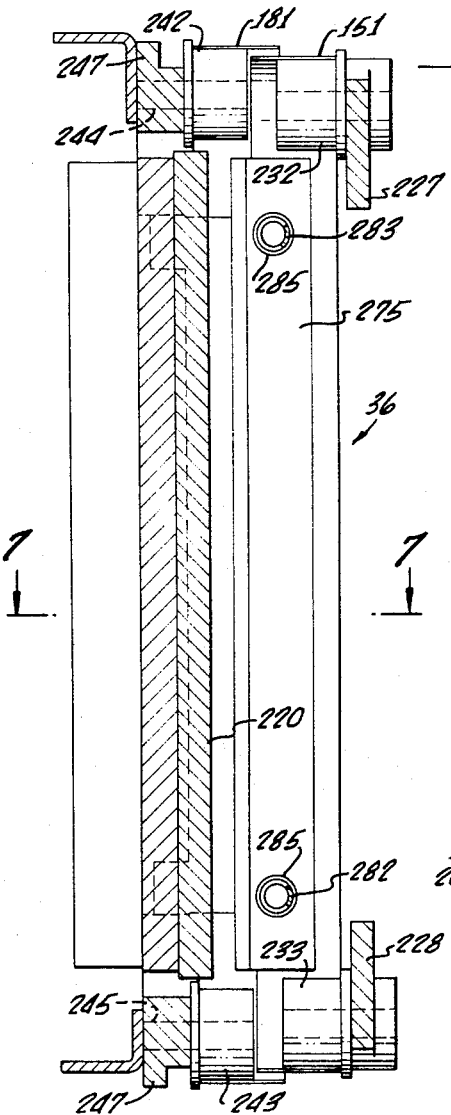
FIG. 6 is an enlarged partial sectional view taken along lines 6—6 in FIG. 3.

Referring now to FIGS. 2, 3 and 6 a support roller system for the elements indicated in FIG. 5 is particularly illustrated. As shown, band 151 and band 181 are trained about a roller network which spaces the bands appropriately on either side of the chart paper in the configuration described hereinbefore. Referring particularly to FIG. 3, a roller support bracket 220 is provided adjustably supported from side deck 42 by means of a pin 221 slidable in a slot 222 formed in the bracket.

A pin 224 is connected to a lever not illustrated by which the pin can be arcuately moved with respect to pin 221. Pin 224 rides within a slot 225 formed in the bracket extending at a right angle to slot 222. Consequently, movement of the lever is effective to move bracket 220 forward and backward with respect to the recording station. This permits the bands to be selectively separated, for loading the paper, and then brought back into close proximity for recording operations.

Bracket 220 otherwise includes a pair of upwardly extending corner projections 227, 228 each having a roller shaft 229, 230, respectively, secured thereto. Rollers 232, 233 are journaled upon the shafts and serve to support band 151 on one side of the chart paper.

As is best shown in FIG. 6, band 181 is similarly supported upon a pair of rollers 242, 243 supported on opposite sides of the chart paper by shafts 244, 245 that are secured to bracket 247 mounted on deck 42. It should be noted that, as viewed in FIG. 6, the distance between rollers 232, 233 is slightly less than the distance between rollers 242, 243. Furthermore, as is apparent from FIG. 3, rollers 242, 243 are set slightly forward of rollers 232, 233 so that the proper spacing is achieved between bands 151, 181. The roller arrangement described is particularly advantageous in that it spaces bands 151, 181 in desired location for satisfactory motion of the styli while at the same time providing a compact design which results in minimal width of the recorder frame with respect to the width of the chart paper.

As further shown in FIG. 3, bands 151, 181 are spaced apart or separated by guide blocks located near the supporting rollers. For example, block 251 is supported from an extension 252 fastened to side deck 42. The block serves to align the edge of band 181 along the proper path as well as maintaining sufficient space between bands 151, 181 to prevent contact thereof. Also illustrated are support rollers 261, 262 journaled on shafts 263, 264, respectively, for supporting indicator strip 31. In similar fashion, rollers 266, 267 are provided for supporting indicator strip 32.

Figure 7:
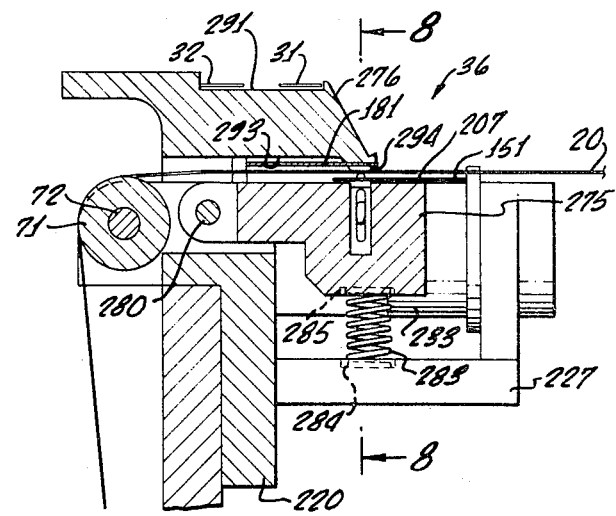
FIG. 7 is an enlarged fragmentary sectional view taken along lines 7—7 in FIG. 6.

A back-up plate 275 is provided on the inner side of band 151 and a back-up plate 276 is provided on the outer side of band 181. Referring particularly to FIGS. 6 and 7 the orientation of the stylus bands and back-up plates is illustrated in detail. Plate 275 is hingedly mounted on bracket 247 supported on the side deck, have a lower edge thereof journaled upon two pins, one of which is indicated in FIG. 7 by numeral 280. The back of member 275 is spring biased toward band 151 by a pair of coil springs 282, 283 that extend between plate 275 and recessed openings 284, 285 formed in brackets 227, 228 respectively. Plate 275 is otherwise provided with an elongate slot 286, extending the full length of face 287 thereof, oriented adjacent band 151.

Plate 276 comprises an extension of bracket 247 that is fixedly secured upon side deck 42 having a recessed front face 291 adapted to receive indicator strips 31, 32 respectively and a recessed back face 293 adapted to provide clearance for band 181. Back face 293 terminates in a guide surface 294 that contacts and serves as a back-up surface for band 181 opposite stylus 296. As previously described, stylus 294 is formed in band 181 and supported opposite stylus 296.

Figure 8:
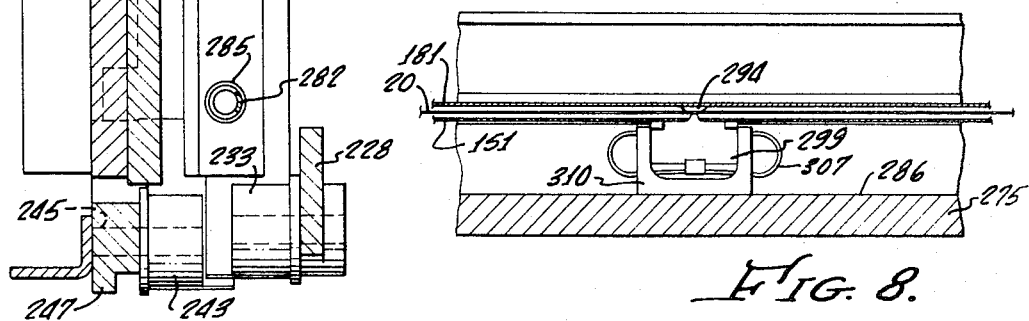
FIG. 8 is an enlarged fragmentary sectional view taken along lines 8—8 in FIG. 7.
Figure 9:
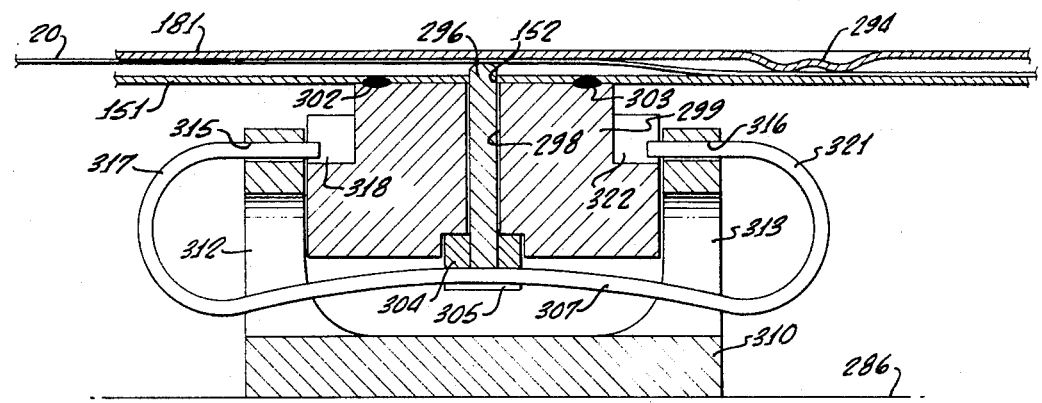
FIG. 9 is an enlarged fragmentary diagrammatic view illustrating the details of the stylus points utilized in the preferred embodiment.

Stylus 296 is supported from a stylus carriage illustrated in detail in FIGS. 8 and 9. Stylus 296 is generally mounted within an opening 298 formed through the center of a support block 299 that is secured to band 151 such as by spot welds 302, 303. Stylus 296 is formed with a back block 304 at one end having an opening 305 formed therethrough adapted to receive a spring 307. Spring 307 mounts stylus 296 and block 299 upon a slide block 310 of generally U-shaped configuration having openings 312, 313 formed in either end thereof, and other openings 315, 316 formed in the respective ends thereof adjacent block 299. As shown, end 317 of spring 307 loops through opening 312 and opening 315 and seats within an opening 318 formed in the edge of blcok 299. In similar fashion end 321 of spring 307 loops through opening 313 and opening 316 to seat within an opening 322 formed in the opposite edge of block 299. It should be apparent that block 310 is slidable along elongate slot 286 and that stylus 296 and block 299 are resiliently mounted with respect to block 310. Accordingly the point of stylus 296 exerts pressure upon the chart paper and back-up band 181 sufficient to form a trace on the chart.

The point of stylus 296 is rounded and of smaller diameter than about one-third the diameter of stylus 294. Stylus 294 is formed in the tape as a generally conical surface having a dimple formed in the peak thereof that is presented to the paper for writing. It has been found that the use of this stylus configuration along with proper stylus pressures eliminates the possibility of tearing or punching through the chart. Thus, the diameter of stylus 294 is larger than hole 152 for stylus 296, so it can pass over the hole without dropping in. This eliminates tearing of the paper. At the same time tape 151 bridges channel 286 to form a back-up surface for stylus 294. In the arrangement shown, both styli are resiliently biased against the paper, but stylus 294 exerts a greater force upon the paper than stylus 296. This also contributes to the smooth recording operation achieved by the system, without tearing of the paper. Also, since stylus 294 has an effective diameter greater than the diameter of the hole of stylus 296, both a narrow trace and a wide trace are provided on the chart paper, and this facilitates the interpretation of the chart recordings.

In the operation of the embodiment described herein, motor 166 is selectively controlled by a first electrical recording input and motor 196 is controlled by a second electrical recording input such that the instantaneous position of bands 151, 181 provides two independently controlled traces on chart 20 which have not time displacement therebetween, and which can cross without restriction.

The chart paper is selectively advanced at a constant or an intermittent rate under the control of motor 102. Indicator bands 31, 32 traverse parallel paths opposite scales 25, 26 respectively and are visible through window 14 so that the instantaneous position of each stylus is visible.

The recorder described herein offers numerous advantages over prior art recorders, particularly insofar as it enables direct recording of two overlapping traces upon a single chart without time displacement therebetween. The stylus arrangement described is particularly advantageous in that it enables recording of a wide trace and a narrow trace overlapping therewith without tearing or punching through the chart paper. The chart drive arrangement is particularly susceptible of use with pressure sensitive chart paper of the type described and provides positive error-free movement from an easily accessible supply roll station to a positively free rolling take-up roll.

Although the recorder has been described as functioning to eliminate time displacement of the traces on the chart, it should be recognized that it is not limited to that arrangement. Thus, if desired, a predetermined time displacement between traces could be obtained by proper placement of the styli and back-up bands.

What is claimed is:

1. A chart recorder comprising
pressure-sensitive chart paper;
chart drive means for selectively advancing a section of said chart paper from a supply station past a recording station to a restorage station;
first stylus means located at said recording station eaving a rounded point for exerting pressure upon one side of said chart paper;
second stylus means positioned at said recording station fo exerting pressure upon the other side of said chart paper, having a dimpled surface shaped to cross over the first stylus means in the event both stylus means approach the same chart position; and
stylus drive means for independently moving the first stylus means and the second stylus means back and forth across said chart in an angular direction with respect to the direction of advancement of said chart, in response to first and second electrical recording signals.

2. The chart recorder of claim 1 wherein the point of the second stylus means is of greater diameter than the point of the first stylus means and wherein the first stylus means and the second stylus means are positioned on opposite sides of said chart paper and are aligned so that they exert pressure along identical recording paths across and on opposite sides of the chart paper.

3. The chart recorder of claim 2 wherein said stylus drive means includes a first thin flexible band trained about pulleys located along one side of the section of chart paper, the first stylus being formed in the first band, and power means associated with said band for moving the band and stylus along a path extending between said pulleys, and
a second flexible band trained about pulleys arranged proximate the opposite side of the section of chart paper the second stylus being connected to the second band, and power means for selectively moving the second band along a path extending between said pulleys.

4. The chart recorder of claim 3 further including first and second flexible indicator strips, respectively connected to the first and second bands for movement therewith, each said indicator strip having a mark formed thereon to identify the instantaneous position of the stylus associated therewith and wherein the stylus means have points of different shape and produce distinguishable traces upon the chart paper.

5. The chart recorder of claim 2 wherein said chart drive means includes a flexible belt having pins projecting from the outer surface thereof, said flexible belt being trained about a drive pulley and at least one idler pulley located proximate the chart whereby the projections engage corresponding holes formed in the edge of the chart for advancement thereof.

6. A chart recorder comprising chart drive means for selectively advancing a section of chart paper from a supply station past a recording station to a restorage station;

a first flexbile band trained about pulleys located at said recording station along one side of chart paper and carrying first stylus means for exerting pressure upon one side of said chart paper;

a second flexible band trained about pulleys positioned at said recording station arranged proximate the opposite side of the section of chart paper with second stylus means connected to the second band for exerting pressure upon the other side of said chart paper; and power means associated with said bands for independently moving the first stylus means and the second stylus means back and forth across said chart in an angular direction with respect to the direction of advancement of said chart, in response to first and second electrical recording signals, the first stylus means and the second stylus means being positioned on opposite sides of said chart paper and being aligned so that they exert pressure along identical recording paths across and on opposite sides of the chart paper, each of said bands being trained along a path proximate said chart paper and opposite the other stylus means carried by the other band to act as a back-up surface for said other stylus means.

7. The chart recorder of claim 6 wherein the first stylus is resiliently connected to a block slidable along a channel formed in an elongate plate connected to said recording station, with said plate and the first stylus being resiliently biased toward the band of said second stylus means into contact with said paper.

8. The chart recorder of claim 7 wherein the first band is positioned proximate the channel, acting as a bridge thereover, to prevent the second stylus from dropping into said channel.

9. The chart recorder of claim 7 wherein the second stylus is resiliently biased into contact with the paper at a lower force than the biasing force exerted upon said first stylus.

10. The chart recorder of claim 9 further including means for supporting a roll of chart paper and a storage station comprising a take-up roll and means for selectively rotating said take-up roll to respool said chart paper.

11. A chart recorder comprising chart drive means for selectively advancing a section of chart paper from a supply station past a recording station to a restorage station;

first stylus means located at said recording station for exerting pressure upon one side of said chart paper;

second stylus means positioned at said recording station for exerting pressure upon the other side of said chart paper; and stylus drive means for independently moving the first stylus means and the second stylus means back and forth across said chart in an angular direction with respect to the direction of advancement of said chart, in response to first and second electrical recording signals, the first stylus means and the second stylus means being positioned on opposite sides of said chart paper and being aligned so that they exert pressure along identical recording paths across and on opposite sides of the chart paper, said chart means including a flexible belt having pins projecting from the outer surface thereof, said flexible belt means being trained about a drive pulley and at least one idler pulley being located proximate the chart whereby the projections engage corresponding holes formed in edge of chart for advancement thereof, said chart recorder also including a supply station comprising a pair of V members for supporting a roll of chart paper and a retaining roller resiliently biased toward said V members to retain a chart roll therein, said V members having a resilient coating formed thereon whereby back friction is exerted upon chart paper withdrawn from said roll.

12. A chart recorder comprising chart drive means for selectively advancing a section of chart paper from a supply station past a recording station to a restorage station;

first stylus means located at said recording station for exerting pressure upon one side of said chart paper;

second stylus means positioned at said recording station for exerting pressure upon the other side of said chart paper; and stylus drive means for independently moving the first stylus means and the second stylus means back and forth across said chart in an angular direction with respect to the direction of advancement of said chart, in response to first and second electrical recording signals, the first stylus means including a stylus having a rounded point and said second stylus means including a stylus having a point of dimpled conical shape, with said second stylus having a diameter greater than the diameter of said first stylus, the first stylus means and the second stylus means being positioned on opposite sides of said chart paper and being aligned so that they exert pressure along identical recording paths across and on opposite sides of the chart paper.

* * * * *